(12) United States Patent
Wirtz et al.

(10) Patent No.: US 7,315,830 B1
(45) Date of Patent: Jan. 1, 2008

(54) METHOD, SYSTEM AND COMPUTER PROGRAM PRODUCT FOR ORDERING MERCHANDISE IN A GLOBAL COMPUTER NETWORK ENVIRONMENT

(75) Inventors: Joseph G. Wirtz, Menomonee Falls, WI (US); John L. Bendler, Milwaukee, WI (US)

(73) Assignee: Nexus Company, Ltd., Osaka (JP)

( * ) Notice: Subject to any disclaimer, the term of this patent is extended or adjusted under 35 U.S.C. 154(b) by 52 days.

(21) Appl. No.: 09/635,805

(22) Filed: Aug. 11, 2000

(51) Int. Cl.
*G06Q 30/00* (2006.01)
(52) U.S. Cl. .............................. 705/26; 705/27; 705/1; 709/203; 709/247; 345/418; 370/460
(58) Field of Classification Search ................ 705/26, 705/27; 345/700, 853, 410; 709/247, 203; 370/466
See application file for complete search history.

(56) References Cited

U.S. PATENT DOCUMENTS

| | | | |
|---|---|---|---|
| 5,142,662 A | 8/1992 | Gump et al. | ................. 395/100 |
| 5,745,681 A | 4/1998 | Levine et al. | ............. 395/200.3 |
| 5,909,492 A | 6/1999 | Payne et al. | ................... 380/24 |

(Continued)

FOREIGN PATENT DOCUMENTS

JP          11-316777          11/1999

(Continued)

OTHER PUBLICATIONS

Web pages from web site www.airnet.com extracted from Internet on Mar. 22, 2000, received with IDS, paper No. 4, pp. 13, hereinafter referred to as Arinet.*

(Continued)

*Primary Examiner*—Yogesh C. Garg
(74) *Attorney, Agent, or Firm*—Greer, Burns & Crain, Ltd.

(57) ABSTRACT

An electronic shopping server formats and sends an electronic page, having an integrated shopping basket with drag and drop functionality, from a virtual catalog to a plurality of clients. The server includes an e-sessions controller that manages and tracks each session with the clients, profile generator that identifies and authorizes each consumer to engage in the sessions, catalog selector responsive to on-demand requests for the contents and supporting data of each catalog page, and order processor that supports purchase requests. The e-sessions controller manages the sessions by causing each client to launch an electronic sessions application. The resident application includes a local sessions controller that brokers all client communications with the server and implements the instructions from the e-sessions controller. The resident application also includes an image generator for displaying an image of each item from the catalog page, descriptive data generator for displaying supporting data for each item, and an order panel generator for displaying a shopping basket that remains on the same page with the image at all times. An order initiator can be included to send a request for the server to create a facsimile of the shopping basket. An item adder and item remover cause items to be added/removed from the client's basket and, if included, server's basket upon executing a web page function. An order executor synchronizes the two shopping baskets and/or sends a request to purchase the items listed in the shopping basket. The shopping basket can be configured to travel with the consumer to receive input from various servers hosting different web sites.

35 Claims, 7 Drawing Sheets

U.S. PATENT DOCUMENTS

| | | | | |
|---|---|---|---|---|
| 5,960,411 | A * | 9/1999 | Hartman et al. | 705/26 |
| 6,032,130 | A | 2/2000 | Alloul et al. | 705/27 |
| 6,101,482 | A * | 8/2000 | DiAngelo et al. | 705/26 |
| 6,125,352 | A * | 9/2000 | Franklin et al. | 705/26 |
| 6,496,208 | B1 * | 12/2002 | Bernhardt et al. | 345/853 |
| 6,519,627 | B1 * | 2/2003 | Dan et al. | 709/203 |
| 6,728,785 | B1 * | 4/2004 | Jungck | 709/247 |
| 6,782,003 | B1 * | 8/2004 | Giroux et al. | 370/466 |
| 2002/0054059 | A1 * | 5/2002 | Schneiderman | 345/700 |
| 2002/0055878 | A1 * | 5/2002 | Burton et al. | 705/26 |

FOREIGN PATENT DOCUMENTS

| | | |
|---|---|---|
| JP | 3069846 | 4/2000 |
| JP | 2000-163480 | 6/2000 |
| JP | 2001-076040 | 3/2001 |
| WO | WO 99/67700 | 12/1999 |

OTHER PUBLICATIONS

Business editors, "ARI Signs First RV Industry Supplier to Complete Dealer System; Contact with Workhorse Custom Chassis Opens New, But Related Market for © ARI", Business Wire; New York; Feb. 23, 1999 extracted from Internet http://proquest.umi.com on 12.*

Business editors, "ARI Signs First RV Industry Supplier to Complete Dealer System; Contract with Workhorse Custom Chassis Opens New, But Related Market for © ARI", Business Wire; New York; Feb. 23, 1999 extracted from Internet http://proquest.umi.com on 12.*

IBM Corp., "Visual Configurator System for Configuring and Ordering IBM Products," Technical Disclosure Bulletin, vol. 34, No. 12, May 1992, pp. 368-371.*

Electronic Catalogs, "Provides instant access to virtually any parts and service data," Mar. 22, 2000, http://www.arinet.com/products/electroniccatalogs.htm.

EMPARTviewer, "EMPARTviewer™," Mar. 22, 2000, http://www.arinet.com/products/empartviewer/index.htm.

EMPARTpublisher, "EMPARTpublisher™," Mar. 22, 2000, http://www.arinet.com/products/empartpublisher/index.htm.

Enigma Product Suite-Intelligent eIPC, Mar. 24, 2000, http://www.enigma.com/products/eipc.htm.

Enigma Product Suite- Intelligent eIPC Screenshot, "Spare Parts e-Catalog," Mar. 24, 2000, http://www.enigma.com/products/eipc_screenshot.htm.

InterWorld Corporation, "Commerce Exchange," Apr. 18, 2000, http://www.interworld.com/.

PartSmart, ". . . a powerful tool you can't afford to be without! With ARI's PartSmart™ electronic parts catalog, you'll have the power to save time, money and . . . ," Mar. 22, 2000, http://www.arinet.com/products/partsmart/index.htm.

* cited by examiner

METHOD, SYSTEM AND COMPUTER PROGRAM PRODUCT FOR ORDERING MERCHANDISE IN A GLOBAL COMPUTER NETWORK ENVIRONMENT

BACKGROUND OF THE INVENTION

1. Field of the Invention

The present invention relates generally to purchasing products from an electronic catalog, and more specifically, to a system, method and computer program product for providing a user friendly graphical interface for ordering products over a computer network.

2. Related Art

As well known to persons skilled in the relevant art(s), the global Internet is a vast interconnection of various computer networks. The computer networks vary in size and type such as, local internets, corporate intranets, local area networks (LAN), wide area networks (WAN), private enterprise networks, and the like. As such, the global Internet provides a cost-effective and reliable medium for the exchange and management of information in an extensive array of computers and computer networks.

Since the Internet has historically represented a low-cost alternative to long distance communications, technological advancements have paved the way for multimedia transmissions over the Internet. For example, the Internet can be used to quickly transmit text, voice, video, graphics and multimedia. As a result, the Internet has evolved to support electronic mailing services (email), video-conferencing, voice telephony and facsimile.

The evolution of Internet technologies has made it possible for government officials, educational institutions, businesses, nonprofit organizations and individuals to communicate with the local networks or personal computers of other persons or organizations. Internet users have been able to established web sites or home pages to promote commercial or personal activities. For example, one may browse various web sites to seek information, purchase products (i.e., goods or services), join product support groups, and the like.

Therefore, the Internet has played an influential role in developing electronic commerce. Many businesses have established web sites to promote their products to potential consumers. Typically, the web site includes a user interface that allows consumers to select items they wish to purchase and place them into a virtual shopping cart while they continue to browse. The virtual shopping cart and its contents are not displayed to the consumer during the browsing/selection process. After the consumer has completed browsing or selecting other items on the web site and is ready to "check out," the consumer completes the ordering process to purchase the items. During the check out phase, the web site directs the consumer to another web page where the consumer must complete an order form to provide shipping instructions and payment information.

Many problems exist with conventional electronic shopping carts. The check out process can be time extensive and poses security risks because sensitive information must be transferred across the Internet. Not only would the consumer have to enter a credit card account number that must be validated by a remote server and enter shipping instructions, but each item placed in the shopping cart must be validated by the remote server. For example, the server would need to confirm whether the item is still in stock. The server would also need to verify price changes. Oftentimes, at the time of placing the order, the applicable tax and shipping/handling expenses are not known, and the consumer would not be presented with an accurate invoice.

Conventional electronic shopping carts do not facilitate the easy exchange of new or additional product information about a product while the consumer is browsing the web site. For instance, a consumer can purchase a product online and later discover that the price has changed or the model is no longer being manufactured. Similarly, if a consumer requires additional information describing the product, conventional electronic commerce sites would take the consumer to another web page or web site, and the consumer may lose the information that has been added to the shopping cart.

It is also common for conventional shopping carts to be located on a separate web page than the products that are being advertised. Therefore, each time a consumer selects or sends a product to the shopping cart, the consumer is unable to view the shopping cart's contents unless the consumer visits the other page. As a result, the consumer may have to leave the web site or possibly lose his or her place in or connection to the web site. Unless the consumer views the shopping cart, the consumer can forget which items that have been selected and their total price.

Consequently, a system and method are needed to solve the above-identified problems and provide a simple, efficient and cost-effective way to provide real time online product information and place electronic orders.

SUMMARY OF THE INVENTION

The present invention overcomes the aforementioned problems by providing an electronic shopping system for formatting and sending an electronic page from a virtual catalog to a plurality of consumers using computers connected to a computer network. An electronic shopping server manages multiple simultaneous shopping sessions with a plurality of client computers.

In an embodiment, the electronic shopping server sends an initialization packet to a consumer's computer to launch an application (e.g., Java applet or the like) to display an interactive catalog page on the client display. A local sessions controller is included as part of the application and is used to broker all client communications with the server and to implement the instructions from an e-sessions controller located on the electronic shopping server. The resident application also includes an image generator, descriptive data generator and order panel generator.

The image generator contains instructions for displaying the contents of each catalog page. The contents include the advertised items or products (i.e., goods or services). The descriptive data generator contains instructions for displaying supporting data for the contents. The supporting data includes price, product name, model, size, color, or the like. In an embodiment, the contents are an image map of a parts explosion drawing. Activating a hot spot on the image map allows a user to gain pricing and additional information about the part corresponding to the hot spot.

The order panel generator includes instructions for displaying a metaphorical shopping basket, shopping cart, trolley, or the like. As the consumer selects items to be purchased, these items are placed in the shopping basket that is integrated into the catalog page, so that the shopping basket is displayed on the same browser page with the advertised items. Thus, the consumer does not have to visit a different browser page to view the items listed in the shopping basket. In an embodiment, the shopping basket travels from one web site to the next as the consumer browses other e-commerce web sites.

The resident application also includes an item adder and item remover that interact with the client input device to add or remove, respectively, items in the shopping basket. The present invention supports the use of a pointing device, such as a mouse or the like, to, for example, drag and drop or double-click an item to produce the add or delete event. Other input methodologies are also supported by the present invention. In an embodiment, the shopping basket is updated (i.e., adding/removing items) by reading the files included with the resident application for the current catalog page.

Accordingly, it is a feature of the present invention to provide a client-based application containing all requisite information and instructions to display and list items within a shopping basket, without having to send a query to the hosting server. Advantages of the present invention include the realization of a significant savings in time by locally processing electronic orders, and a substantial increase in consumer security by reducing the amount of client-server data transfers.

To support the resident client-based application, the electronic shopping server also includes a catalog selector that is responsive to on-demand requests for the contents and supporting data for each catalog page. The electronic shopping server also includes an order processor that facilitates the consumer's ability to purchase items advertised on the catalog pages. In an embodiment, as each consumer places an item into the client's shopping basket, the order processor also maintains a list, on the server, of the items identified in the client's shopping basket. In this embodiment, when the consumer executes the order, the order processor compares the list stored on the electronic shopping server with the list displayed in the client's shopping basket and checks for errors.

A feature of the present invention is the ability to quickly select and view items placed in a shopping basket while the user continues to browse the other items in an electronic catalog. Not having to change the browser page to view the shopping basket saves time. Moreover, this feature enables the user to instantly and conveniently keep track of the order and the total price of the selected items.

In an embodiment, the resident client-based application also includes an order initiator having the capability to send a request to the server to create a server-side version of the shopping basket when the consumer places the first item in the client-side basket. The server's basket would contain a copy of every item added to or deleted from the client's basket. The item adder and item remover would cause items to be added to and removed from the client and server's baskets. An order executor can be used to synchronize the two shopping baskets and send a request to the order processor to purchase the items listed in the shopping baskets.

Within the electronic shopping server, the e-sessions controller manages and tracks each shopping session. The server also includes a profile generator that identifies and authorizes the consumer to engage in the shopping sessions. The profile generator is programmable to query the consumer, search engines, profiling engines, databases, or the like to generate a consumer profile that is used to format the catalog page and support other shopping session requirements. The profile also includes personal information about each consumer, such as shipping address and payment data, to accelerate the order placement process. The e-sessions controller or a route controller within the server can compress and encrypt all communications from the server to provide a secured connection.

An advantage of the present invention is that it provides a user-friendly environment for gathering real time information about the products advertised in an electronic catalog. By moving a mouse or other pointing device, a consumer can receive up-to-date information about the price and availability of the products. Moreover, by clicking the mouse, the consumer can promptly select and send the products to a shopping basket to electronically purchase the products and have them shipped to a designated address and/or billed to a credit card account. Additionally, the consumer can use the mouse to drag and drop products into the shopping basket or remove them as easily.

Another advantage of the present invention is the ability to process online orders at a significant savings in time and substantial improvement in overall efficiency. Since the shopping basket is maintained and displayed on the same browser page with the advertised products, the user can verify the selected products as the consumer continues to browse. At checkout time, the consumer does not need to wait to receive the shopping basket to confirm the order. On the contrary, the order can be sent instantly with a simple click of a virtual button.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE PREFERRED EMBODIMENTS

Table of Contents

I. Overview of an Electronic Shopping System

II. Overview of Client Components for Electronic Shopping Sessions

III. Software and Hardware Embodiments

IV. Exemplary Electronic Shopping Session

V. Cyber-Trekking Shopping Sessions

VI. Conclusion

I. Overview of an Electronic Shopping System

Figure 1:
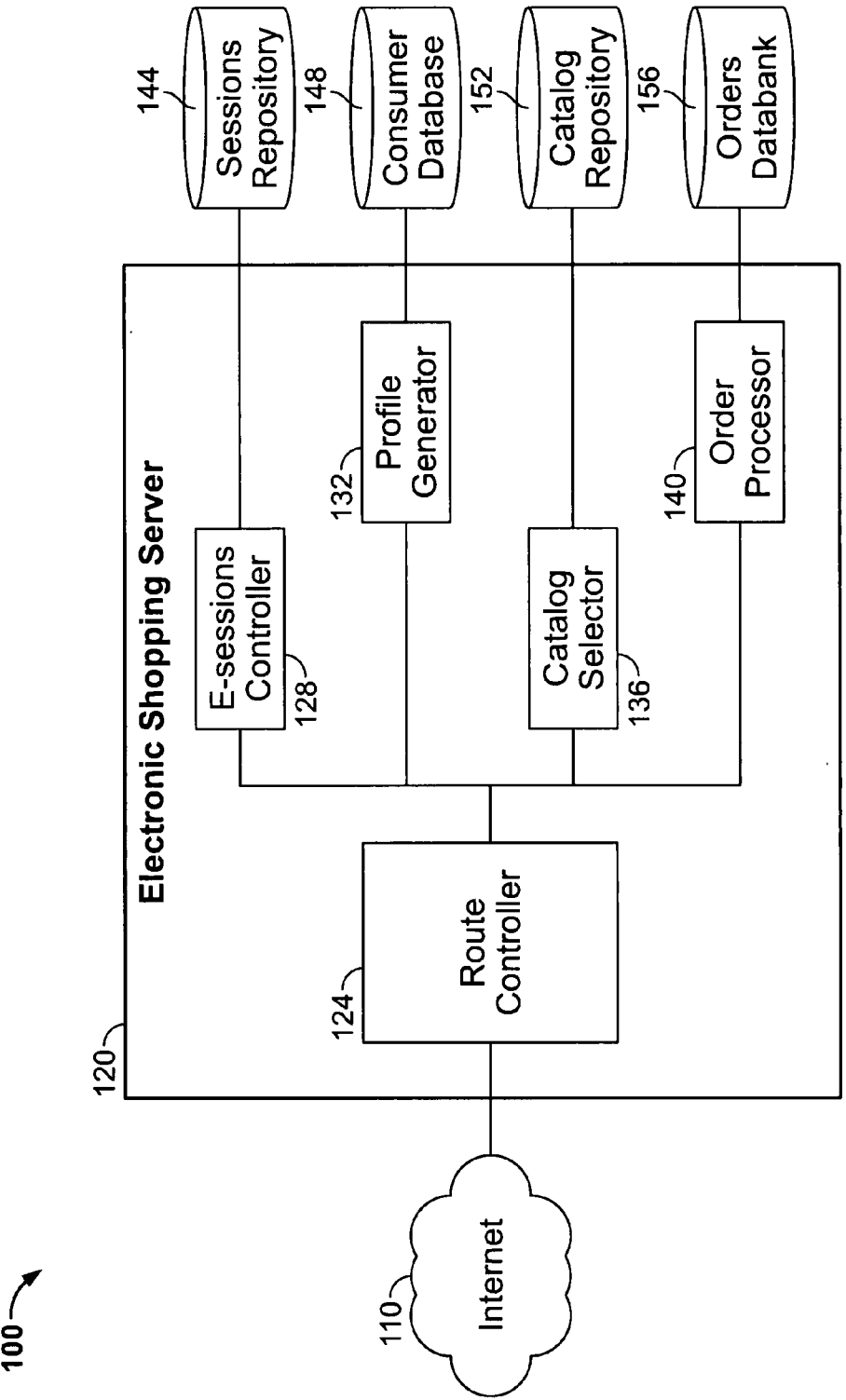
FIG. 1 illustrates a high-level block diagram of an embodiment of an electronic shopping system.

FIG. 1 illustrates, according to an embodiment of the present invention, an electronic shopping system 100 for managing online shopping sessions with one or more consumers (not shown) over a computer network 110. Electronic shopping system 100 includes an electronic shopping server 120, sessions repository 144, consumer database 148, catalog repository 152 and orders databank 156. System 100 supports bidirectional communications between electronic shopping server 120 and each consumer over a diverse computer network 110, which includes wired or wireless local area networks (LAN) and/or wide area networks (WAN), such as an organization's intranet, the global-based Internet (including the World Wide Web (WWW)), or the like.

Electronic shopping server 120 ("server 120") comprises multiple routines and subroutines that permit server 120 to command and control multiple, simultaneous shopping sessions with a plurality of consumers. FIG. 1 is a conceptual illustration of electronic shopping server 120 that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

Electronic shopping server 120 represents one or more computers providing various shared resources with each other and to the other network computers. The shared resources include files for programs, web pages, databases and libraries; output devices, such as, printers, plotters, display monitors and facsimile machines; and communications devices, such as modems and Internet access facilities. The communications devices can support wired and wireless communications, including satellite, terrestrial (fiber optic, copper, coaxial, and the like), radio, microwave and any other form or method of transmission. Server 120 is configured to support the standard Internet Protocol (IP) developed to govern communications over public and private Internet backbones. The protocol is defined in Internet Standard (STD) 5, Request for Comments (RFC) 791 (Internet Architecture Board). The servers can also support transport protocols, such as, Transmission Control Protocol (TCP), User Datagram Protocol (UDP) and Real Time Transport Protocol (RTP). The transport protocols support various types of data transmission standards, such as File Transfer Protocol (FTP), Hypertext Transfer Protocol (HTTP), Simple Network Management Protocol (SNMP), Network Time Protocol (NTP), and the like. Server 120 is also configured to support various operating systems, such as, Netware™ available from Novell®; MS-DOS®, Windows NT® and Windows® 3.xx/95/98/2000 available from Microsoft®; Linux® available from Linux Online Inc.; Solaris™ available from Sun Microsystems, Inc.; and the like as would be apparent to one skilled in the relevant art(s).

As shown in FIG. 1, electronic shopping server 120, in a representative embodiment, includes a route controller 124, e-sessions controller 128, profile generator 132, catalog selector 136 and order processor 140. Route controller 124 exchanges communications with one or more consumers or potential consumers using a client workstation (not shown). The client workstations (described in detail below) are configured to communicate with route controller 124 over computer network 110. Also, as shown in FIG. 1, route controller 124 functions as a switch for routing communications among e-sessions controller 128, profile generator 132, catalog selector 136, order processor 140 and the client workstations. Hence, in an embodiment, all client requests to read/write to server 120 are facilitated through route controller 124. Route controller 124 receives data packets (e.g., IP datagrams) containing the server requests, processes the data packets to read or determine the appropriate destination and routes the data packet accordingly. In an embodiment, route controller 124 includes a routing queue (not shown) for storing the data packets until the destined system 100 component (e.g., e-sessions controller 128, profiler generator 132, client workstation, and the like) becomes available. Route controller 124 determines component availability by, for example, evaluating the capacity and current workload of the destined system component, resources required by the submitted job, and the like as would be apparent to a person skilled in the relevant art(s).

Route controller 124 also protects a user's (i.e., consumer, system 100 administrator, and the like) access to the server's data and communications with server 120. In an embodiment, a Secure Sockets Layer (SSL) provides a secure data path for all communications. Access to any resource within the server 120 is controlled by using user authentication, firewalls, encryption, and like security techniques. In an embodiment, access to server 120 requires username/password authentication. As discussed below in reference to profile generator 132, a username/password can be used to determine server access, user roles, security level, and other server functions. For example, server access controls whether a consumer can read, write, and update a consumer profile located in consumer database 148. As such, route controller 124 protects the integrity of system 100, server 120 data, consumers/users of server 120, and the availability of system 100.

The security functions of route controller 124 are integrated into system 100, including the access protocol for computer network 110 (e.g., Internet communications), sessions repository 144, consumer database 148, catalog repository 152 and orders databank 156. In an embodiment, a top-level hypertext node (i.e., a web page) provides open access to the general public. Secure hypertext nodes support the entry of data using a Java applet or the like that validates the data before database entry. This embodiment also supports limited inquiries and contact information by users who have not registered to receive full access to system 100. In addition, each user role is a key component of the security functions. User roles are configured to determine the access of users to data other than their own shopping data, and to determine features of system 100 that each user can exercise.

Another component of electronic shopping server 120 is e-sessions controller 128. E-sessions controller 128 initiates and manages all shopping sessions with consumers over computer network 110. Upon receipt of a data packet requesting permission to initiate a shopping session, e-sessions controller 128 assembles and sends initialization instructions to the consumer's client workstation, as discussed below in connection with FIG. 2. In an embodiment, e-sessions controller 128 uses a Java application to generate the initialization instructions. As would be apparent to one skilled in the relevant art(s), other programming languages could be used, such as, JavaScript, C, C++, or the like. E-sessions controller 128 validates or verifies each consumer's identity through collaborative communications with profile generator 132. During the shopping sessions, e-sessions controller 128 coordinates with catalog selector 136 to provide information about available merchandise to the consumers. Likewise, e-sessions controller 128 coordinates with order processor 140 to support consumer requests to purchase the merchandise. E-sessions controller 128 tracks all transactions with each consumer and assigns a session number that is used to monitor, track and manage an online shopping session. In the representative embodiment shown in FIG. 1, e-sessions controller 128 exchanges communications with sessions repository 144 to store, backup or retrieve programs and files it uses to manage the electronic shopping sessions.

E-sessions controller 128 is also responsible for formatting the data packets or data streams that server 120 sends to each consumer's client workstations. In an embodiment, e-sessions controller 128 compresses the shopping sessions instructions prior to routing them to the consumer's client workstation. In an embodiment, e-sessions controller 128 can also encrypt, or instruct route controller 124 to encrypt, the sessions data packets prior to streaming or downloading them to the client workstations. In an embodiment, e-sessions controller 128 formats the data streams by reading the consumer profiles located in profile generator 132 (discussed in detail below), and configuring the data streams to make them compatible with the client workstations. For example, the data streams can be formatted to support Apple®, Microsoft®, and RealNetworks® multimedia applications; Netscape® (e.g., Navigator® 4.0 or higher) and Microsoft® (e.g., Internet Explorer® 4.0 or higher) browsers capable of handling Java 1.1 or higher, JavaScript, C, C++ and like programming languages; Windows®, Novell® and Linux® operating systems; HyperText Markup Language (HTML), Synchronized Multimedia Integration Language (SMIL), Allaire® Cold Fusion, Apple® Web Objects®, Haht Site®, PHP and Aestiva® scripting languages; and the like as would be apparent to one skilled in the relevant art(s). In an embodiment, the data streams can be formatted to support GIF for graphics, JPEG for photographs, Apple® QuickTime® for dynamic media (i.e., audio and video), Macromedia® Flash™ for simple animation, Macromedia® Shockwave® for more advanced animation, Adobe® Acrobat® for manuals, or the like.

Electronic shopping server 120 also includes profile generator 132 that provides relevant information used to support each consumer's shopping session. As discussed above, profile generator 132 supports the user authentication functions of route controller 124 and user identity functions of e-sessions controller 128. In an embodiment, upon receipt of a consumer's first visit to server 120, profile generator 132 determines the identity of the consumer and authorizes the consumer to receive server data. The consumer's identity can be determined passively or actively. In an embodiment, profile generator 132 sends instructions to the consumer's client workstation to prompt the consumer to enter a username with or without a password. If the consumer has not previously registered, the consumer is granted the option of creating a username and password, or profile generator 132 generates one for the consumer. For future sessions, the consumer would be prompted to enter the username.

In another embodiment, the consumer passively registers with the profile generator 132. For instance, in this embodiment, a packet of information can be sent by profile generator 132 to the consumer's client workstation when the consumer sends a request to initiate a shopping session. This identification packet (i.e., cookies and the like) would be sent back by the consumer's client workstation each time the consumer accesses electronic shopping server 120. The identification packet can contain a username, network address, or any other information profile generator 132 can use to authenticate or identify a registered consumer. The consumer can be prompted to confirm the identity detected from the identification packet.

In another embodiment, profile generator 132 can utilize the consumer's IP number for passive registration. Typically, a temporary IP number is automatically assigned by a consumer's Internet service provider when the consumer logs onto the Internet. Route controller 124 or profile generator 132 can read the IP number from the consumer's data packet request to identify the consumer. This technique can be used when the consumer's client workstation does not accept, for example, cookies.

After profile generator 132 has determined or authenticated the consumer's identity, profiler generator 132 subsequently generates or updates a consumer profile. In an embodiment, a new visitor to server 120 would be prompted to complete a consumer profile during the first registration. In another embodiment, profile generator 132 can automatically create a consumer profile by using search engines, databases, profiling engines, and the like. In yet another embodiment, the consumer profile can be created by researching third party databases, such as Acxiom® or PRIZM™. In an embodiment, after the consumer profile has been created, the consumer is prompted or allowed to update the profile during subsequent sessions. Referring again to FIG. 1, the consumer profiles are stored in consumer database 148.

The consumer profile can include demographic data for each consumer, such as name, residential address, electronic mailing (email) address, credit card account number, billing address, shipping address, and the like, as would be apparent to one skilled in the relevant art(s). The consumer profile can also include information about applicable tax, shipping and handling costs based on the consumer's residential address or requested delivery address. The consumer profile can also include data about the respective client workstations, such as model, manufacturer, serial number, operating system, browser software, word processing programs, graphics software, memory capacity, microprocessor speed, and the like, as would be apparent to one skilled in the relevant art(s). The profile data is used to determine whether the consumers' client workstations meet the basic configuration requirements to receive data packets from electronic shopping server 120. As discussed, the profile data can also be used to configure the data packets from server 120 to make them compatible with the client workstations.

Referring again to FIG. 1, catalog selector 136 generates and sends images, image maps and supporting multimedia data (including text, graphics, audio, video, a combination thereof, and the like) for all merchandise during the shopping sessions. When a shopping session is initiated, catalog selector 136, in an embodiment, selects an image map and supporting data for building a catalog page. The image map and supporting data are sent to e-sessions controller 128, which in turn, integrates this merchandise data into an initialization data packet sent to the client workstations. Subsequently, as the consumer requests information about additional merchandise on other catalog pages, catalog selector 136 provides the appropriate image map and supporting data. Hence, the merchandise data, in an embodiment, are explodable files that enable the browser application on the client workstations to process inquiries about the currently viewed catalog page without having to query the server. As shown in FIG. 1, the merchandise data is stored in catalog repository 152. Catalog selector 136 communicates with catalog repository 152 to support consumer requests for merchandise data.

Electronic shopping server 120 also includes order processor 140 that exchanges communications with e-sessions controller 128 and enables consumers to place online orders for merchandise promoted by catalog server 136. In an embodiment, order processor 140 creates instructions for a client workstation to create an order panel on a text or graphical user interface (GUI). The order panel can represent a virtual shopping basket, shopping cart, trolley, and the like. The instructions from order processor 140 would also include rights for a consumer to add or remove merchandise from the order panel and indicate a quantity. In an embodiment, the order panel instructions are prepared and routed to e-sessions controller 128, which integrates the order panel instructions with the instructions from catalog selector 136 for producing a catalog page containing the merchandise data. E-sessions controller 128 formats the integrated data so that the client's browser application would display the order panel on the same browser page with the merchandise image. In an embodiment, order processor 140 maintains a record of each consumer's order during the shopping session. Accordingly, as a consumer adds or removes items from the order panel, order processor 140 is also configurable to maintain a facsimile of the consumer's current order. Order processor 140 can also be configured to maintain a historical record of all consumer records. In an embodiment, order processor 140 communicates with orders databank 156 to store and retrieve the consumer's current and historical orders.

As discussed, electronic shopping server 120 is supported by sessions repository 144, consumer database 148, catalog repository 152 and orders databank 156 (collectively referred to as "server databases"). Each server database comprises a collection of integrated records used to support electronic shopping server 120 as described above. As would be apparent to a person skilled in the relevant art(s), the server databases can include a relational or object oriented (OO)/component based database management system (not shown), or the like, that controls the storing, retrieving and updating of data and meta-data in the database records. The database management system also controls data integration, enforces integrity rules and constraints (including data integrity and referential integrity), and enforces security constraints. Referring again to FIG. 1, the database management system, in an embodiment, receives communications from a component (i.e., e-sessions controller 128, profile generator 132, catalog server 136 and order processor 140) of server 120 and manipulates the appropriate server database (i.e., sessions repository 144, consumer database 148, catalog repository 152 and orders databank 156) to retrieve, store or update the records, as appropriate. In an embodiment, an Open DataBase Connectivity (ODBC) or Java DataBase Connectivity (JDBC) protocol can be provided for direct connection to the server databases.

II. Overview of Client Components for Electronic Shopping Sessions

Figure 2:
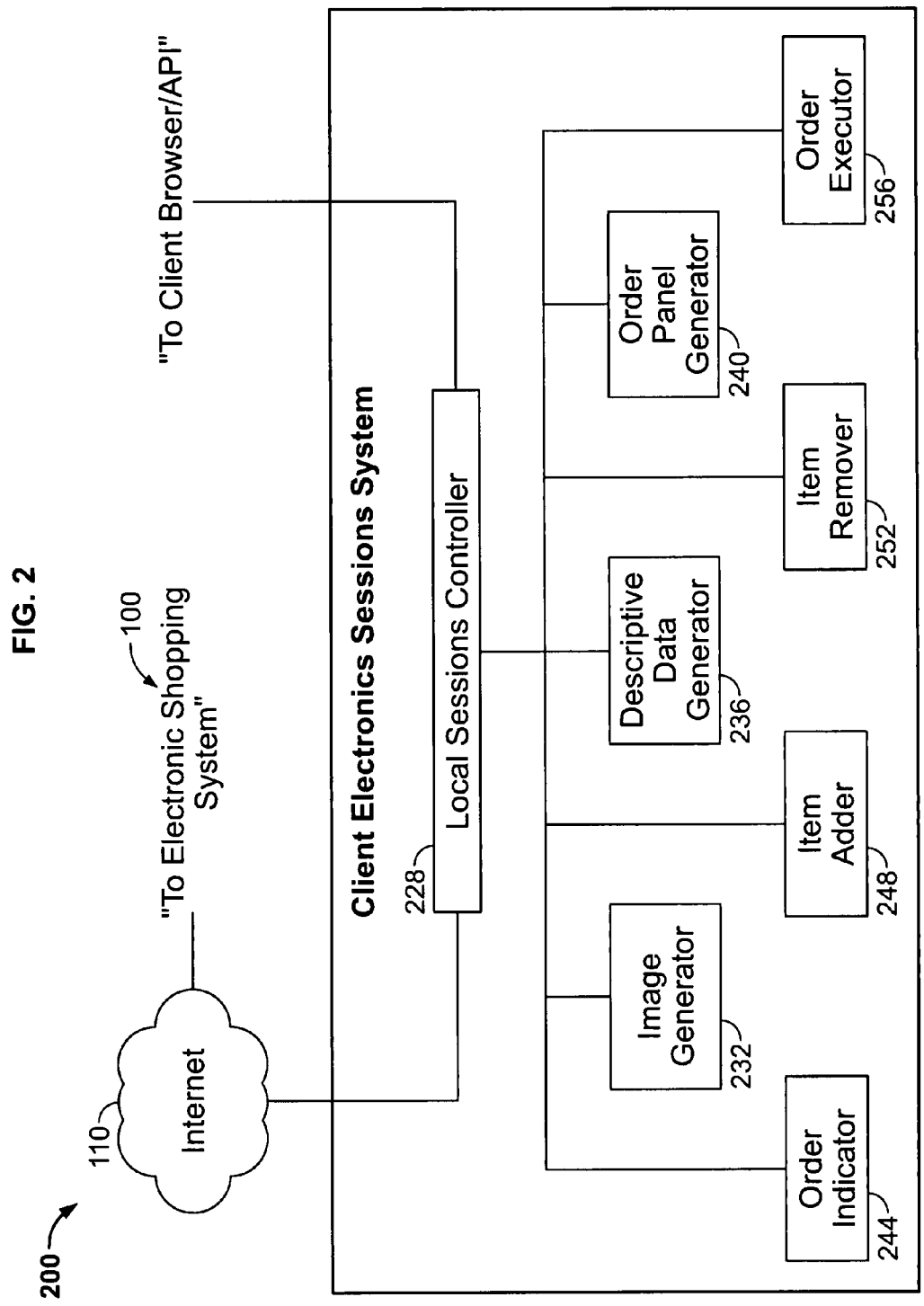
FIG. 2 illustrates a high-level block diagram of an embodiment of a client-side electronic sessions system.

FIG. 2 illustrates, according to an embodiment of the present invention, a client-side electronic sessions system 200 for receiving online shopping sessions from electronic shopping system 100. In a preferred embodiment, client electronic sessions system 200 represents an application program located on a client workstation that is receiving the shopping session. Each client workstation can be a personal computer, personal digital assistant (PDA), telephone, television or like devices linked to computer network 110 and including a display device with the ability to place an electronic order. The display device for each client workstation provides a GUI and enables a user (i.e., consumer) to browse a data stream and interactively communicate with electronic shopping server 120. The display provides graphical controls corresponding to various electronic shopping commands.

In an embodiment of the present invention, each consumer uses a keyboard and/or mouse to interact with electronic sessions system 200 by manipulating the graphical controls of the display (e.g., buttons, scroll bars, links, and the like). In another embodiment, the client workstations are configurable to receive verbal commands to execute various tasks during the shopping sessions. Using a rule-based expert system, a processing unit enables a voice recognition unit to identify the voice of the consumer to recognize and process verbal commands to activate the graphical control. Other input devices can be a mouse wheel, joystick, rudder pedals, touch screen, microphone, joystick, stylus, light pen, or any other type of peripheral unit. The aforementioned is a representative list of input devices that can be used with the present invention. It should be understood that any other type of input device, as would be apparent to a person skilled in the relevant art(s), could be easily included and would not change the scope of the invention. Any presently available or future developed device that is responsive to a general purpose interface is encompassed by the present invention.

An application program interface (API) interacts with the display and input device to support real time visual feedback and communications with the components of electronic sessions system 200. Accordingly, in response to consumers activating a graphical control from the display, the client workstations transmit signals to electronic sessions system 200, and hence electronic shopping server 120, corresponding to the activated graphical control.

Referring again to FIG. 2, client electronic sessions system 200 represents, in an embodiment, a Java applet routed and/or stored on the client workstation hosting the shopping session. As discussed, other programming languages, such as JavaScript, C, C++ or the like, can be implemented. As such, client electronic sessions system 200 comprises multiple routines and subroutines that instruct the client workstation to produce visual representations of the shopping session on the client display. FIG. 2 is a conceptual illustration of client electronic sessions system 200 that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

As shown in FIG. 2, client electronic sessions system 200, in a representative embodiment, includes a local sessions controller 228, image generator 232, descriptive data generator 236, order panel generator 240, order initiator 244, item adder 248, item remover 252 and order executor 256. Local sessions controller 228 interfaces with the files and programs of electronic shopping server 120. Local sessions controller 228 is responsible for initiating and managing the shopping session with electronic shopping server 120 by using a common gateway interface to exchange communications over computer network 110. Local sessions controller 228 also communicates with the client display (e.g., browser application) to provide visual communications to the consumer. Additionally, local sessions controller 228 can also communicate with the API providing signals from the client input device. Generally, local sessions controller 228 handles all events (i.e., signals from the input device) and all aspects of displaying information on client display.

In an embodiment, local sessions controller 228 can be activated when the consumer visits a hypertext node or web site providing a connection to electronic shopping server 120 (shown in FIG. 1). Upon activation, local sessions controller 228 sends a request to route controller 124 (shown in FIG. 1) to initiate a shopping session. After the request has been authenticated and authorized (as discussed above), e-sessions controller 128 (shown in FIG. 1) sends an initialization packet to local sessions controller 228. Local sessions controller 228 decompresses and reads the initialization packet to implement the instructions for coordinating the session.

Figure 4:
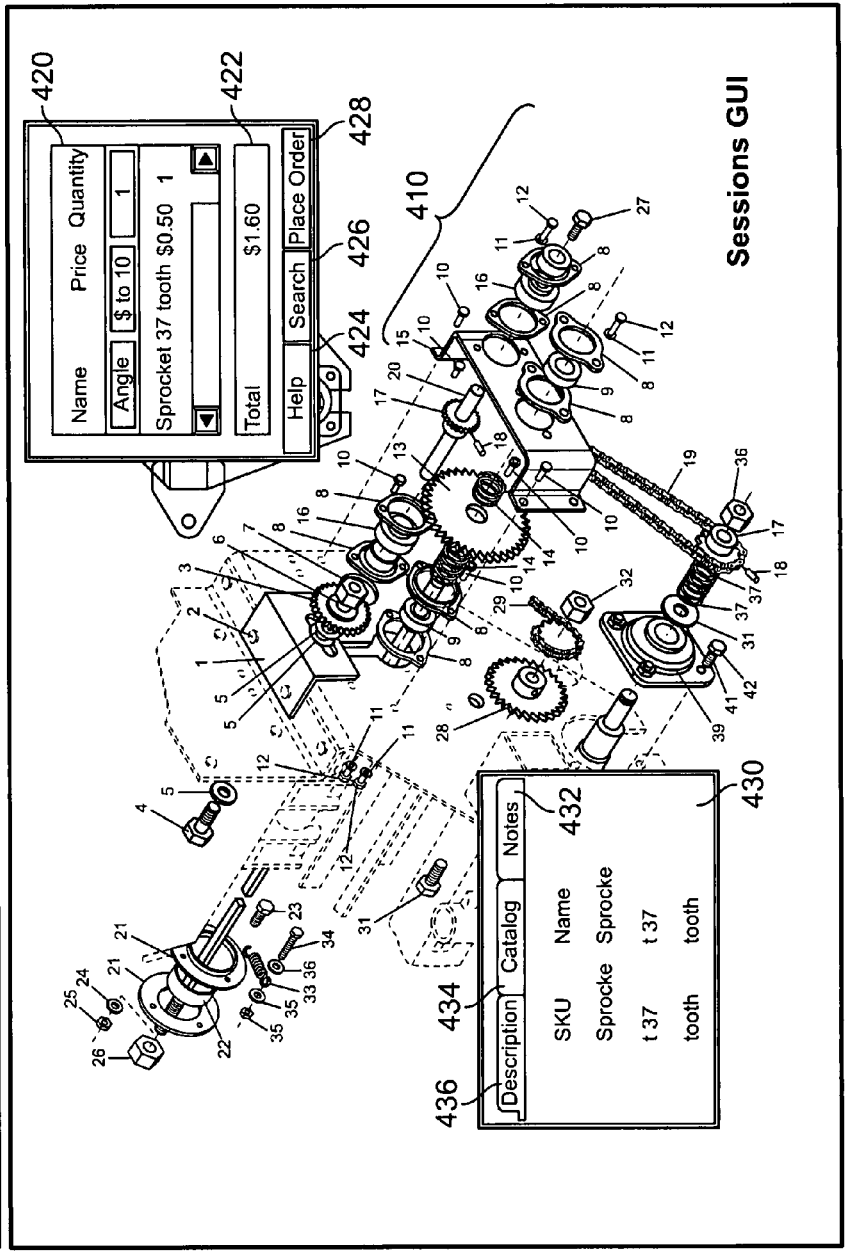
FIG. 4 illustrates an embodiment of a graphical user interface for interacting with an electronic shopping page from a virtual catalog.

The initialization packet, in an embodiment, contains the initialization instructions for opening an electronic shopping page from a virtual catalog. FIG. 4 illustrates an embodiment of GUI 400 for displaying an exemplary electronic shopping page on a client display. As can be seen, GUI 400, in a representative embodiment, includes a merchandise image 410, order panel 420 and descriptive panel 430. Merchandise image 410 visually depicts the product (i.e., goods or services) that is being promoted. In this exemplary embodiment, the product is an assembly of parts 1-42 for a mechanical structure. Thus, merchandise image 410 is an image map providing, for example, a parts explosion image of individual parts 1-42 for merchandise. Each part 1-42 can serve as a link or anchor to another image, image map, web page, web site, and the like. In an embodiment, one of parts 1-42 can be a higher level part assembly. Thus, activating the higher level part 1-42 would cause the browser to load an image map of a subassembly of parts.

Although, in this embodiment, merchandise image 410 displays a parts assembly, it should be noted that the present invention is not limited to merchandise representing mechanical and electrical parts. As would be apparent to a person skilled in the relevant art(s), the present invention supports the promotion of any type of services, goods or commodities, including without limitation, clothing, food, sports equipment, vehicles, jewelry, computers, electronics, flowers, musical compact discs, videocassettes, books, pharmaceuticals, office supplies, home improvement supplies, and the like.

Referring again to FIG. 4, descriptive data panel 430 provides additional information about the parts 1-42 contained in merchandise image 410. As can be seen, in an embodiment, descriptive data panel 430 can display different types of information by manipulating tab controls 432, 434 and 436. Description tab 436, in an embodiment, opens a sub-panel to provide information that describes a selected part 1-42 in the current assembly displayed as merchandise image 410. Such information can include a part name, part number, SKU, model, manufacturer, and the like. Note tab 432, in an embodiment, provides other information about a selected part 1-42 of the current assembly. Such other information can include minimum order requirements, quantity in stock, comments from other customers, critics, and the like, authorized distributors, other sources of similar products, and the like. The sub-panels activated by either note tab 432 or description tab 436 can also contain promotional information about the selected part 1-42, such as advertised sales, quantity or membership discounts, advertisements of related products, and the like. Catalog tab 434, in an embodiment, provides a listing of all parts 1-42 on the current part assembly. It should be understood that additional tabs providing other types of information can be included and are contemplated within the spirit and scope of the present invention. For example, tabs can be included to identify vendors, manufacturers, expected delivery time, warranty terms, similar products, installation instructions, repair services, and the like.

The initial image displayed as merchandise image 410 is determined by the initialization instructions routed to local sessions controller 228 (shown in FIG. 2). The initialization instructions, in an embodiment, contain one or more shopping sessions parameters, including, for example, a session number, local code, tax/shipping code, image key and order panel key. The session number is assigned by e-sessions controller 128 (shown in FIG. 1) and is used to identify a consumer's session from a plurality of simultaneous sessions managed by e-sessions controller 128. The session number remains in local sessions controller 228 which uses the identifier to stamp data exchanges with electronic shopping server 120.

Referring again to FIG. 4, the image map for merchandise image 410 is determined by the image key. The image key identifies the filename where image and supporting data are located in electronic shopping server 120 or catalog repository 152 (shown in FIG. 1). Likewise, the order panel key performs a similar role in generating order panel 420. During the shopping session, the order panel key serves as a pointer to requisite information located in order processor 140 (shown in FIG. 1).

The initialization data packet also includes two optional shopping session parameters: local code and tax/shipping code. The local code and tax/shipping code are determined by profile generator 132 (shown in FIG. 1) and are based on the user's residential or shipping address, as appropriate. The local code can be the user's state, zip code, area code, and the like. Using the local code, profile generator 132 determines the federal, state, municipal or local property, license, privilege, sales, use, excise, gross receipt or other like taxes or duties applicable to, measured by or imposed upon or with respect to the transaction, the property, its sales, its value or its use, or services performed in connection with the property or transaction. Additionally, profile generator 132 uses the local code to calculate the appropriate shipping and handling costs for the transaction. Profile generator 132 generates and supplies the tax/shipping code(s) to local sessions controller 228 (shown in FIG. 2) in the form of one or more rates or percentages.

Referring again to FIG. 2, the initialization data packet also includes commands to load image generator 232, descriptive data generator 236, order panel generator 240, order initiator 244, item adder 248, item remover 252 and order executor 256 as resident applications (such as, Java applets or the like) on the client workstation. Image generator 232 receives the image map specified by the image key and generates merchandise image 410 shown in FIG. 4. Similarly, descriptive data generator 236 receives the supporting data specified by the image key and generates descriptive data panel 430. As discussed, in an embodiment, all merchandise data required to support the currently displayed merchandise image 410 is sent to the client as an explodable file (not shown) associated with image generator 232, descriptive data generator 236 and order panel generator 240. Thus, for each catalog page, all requisite merchandise data is stored on the client for quick and efficient access. When another catalog page is requested, the requisite merchandise data for that page is sent by electronic shopping server 120.

Order panel generator 240, order initiator 244, item adder 248, item remover 252 and order executor 256 communicate with order processor 140 (shown FIG. 1) via the order panel key and manages the format and content of order panel 420. Order panel generator 240 is responsible for generating order panel 420 and controlling its format. As discussed, order panel 420 is a virtual shopping basket, shopping cart, trolley, and the like that can be used to designate one or more merchandise items to be purchased by the consumer. In a preferred embodiment, order panel 420 is maintained and displayed on the same browser page at the same time as merchandise image 410. As such, the consumer can inspect the contents of order panel 420 as the consumer continues to view the contents of merchandise image 410. If the contents for the web page containing merchandise image 410, or merchandise image 410 itself, exceeds the margins of the browser page or screen, the browser page can be scrolled horizontally or vertically to allow the consumer to view all of the web page, or merchandise image 410. Thus, in an embodiment, order panel 420 can be formatted to scroll with merchandise image 410. However, in a second embodiment, order panel 420 can be positioned in a separate window such that order panel 420 does not move, but remains in view, as the browser page is scrolled to display hidden sections of merchandise image 410. In a third embodiment, order panel 420 can be sent to the background or configured to float, as discussed in detail below, to allow the consumer to view information located behind order panel 420.

In an embodiment, order panel 420 remains on the client workstation during the shopping session. Therefore, when a new catalog page is prepared and routed by e-sessions controller 128, the current order panel 420 is integrated into the new catalog page at the client workstation by local sessions controller 228. Therefore, server 120 is not required to maintain a list of items added to order panel 420 and integrate this data into new web pages streamed to the client.

Referring to FIG. 4, order panel 420, in a representative embodiment, contains name, price and quantity fields. The name field displays the name of a selected merchandise item (i.e., part). The quantity field displays the number of items that has been selected for purchase, and price field displays the sales price for the selected item. As it would be apparent to one skilled in the relevant art(s), other fields can be included in order panel 420 and would not change the scope of the present invention. Such fields can include a SKU, color, size, make, model, and the like.

Figure 5:
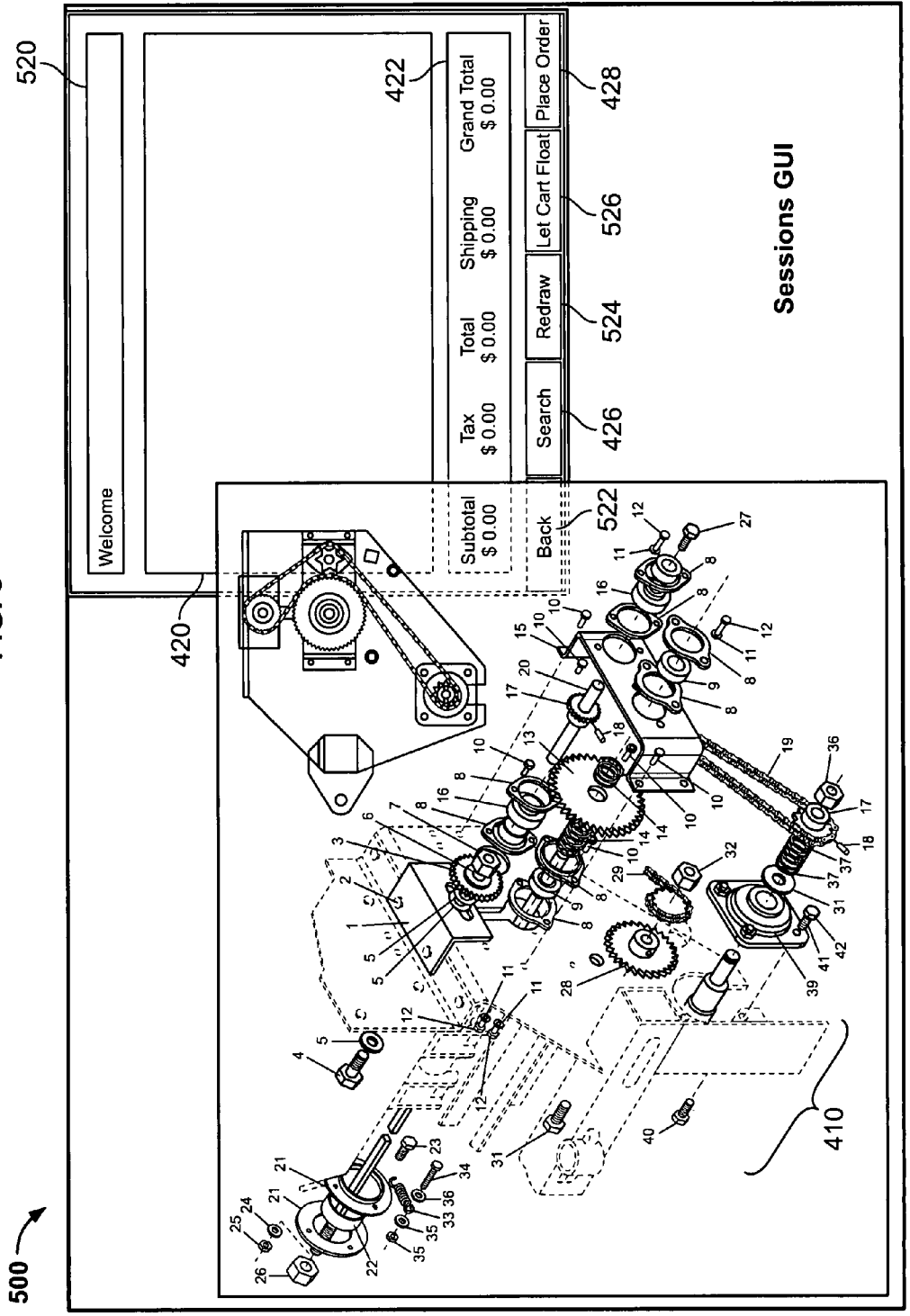
FIG. 5 illustrates a second embodiment of a graphical user interface for interacting with an electronic shopping page from a virtual catalog.

In an embodiment, order panel generator 240 receives the tax/shipping code and calculates the total price. In an embodiment, all calculations are performed locally on the client workstation to secure the consumer's transaction. In an alternate embodiment, the calculations can be performed on electronic shopping server 120, encrypted and routed to local sessions controller 228. Referring again to FIG. 4, order panel 420 includes a price window 422 which provides a running total of all items listed in order panel 420. FIG. 5 illustrates a second embodiment of an exemplary electronic shopping page, shown as GUI 500. As can be seen, GUI 500 contains another embodiment of price window 422. In FIG. 5, price window 422 contains fields for tallying the applicable tax, shipping and handling expenses from the tax/shipping code.

Additionally, referring to FIG. 5, order panel 420 can include a status window 520. In an embodiment, as the consumer moves a pointer over a part 1-42 shown in merchandise image 410, status window 520 displays a description of the part 1-42. The description can include the name of the part 1-42 with or without its price. As described in reference to FIG. 4, when the pointer moves over a part 1-42, similar information about part 1-42 can be displayed in descriptive data panel 430 if description tab 436 has been activated.

In addition to displaying descriptive information, each part 1-42 displayed in merchandise image 410 can also change colors (including hue, saturation, brightness, lightness or any combination thereof) as the pointer moves over parts 1-42. The color is determined by the image key. In an embodiment, different colors can be used to determine the type of image. For instance, if the part 1-42 changes to, for example, blue, the part 1-42 could be a higher assembly image. Thus, activating the part 1-42 would load a subassembly image. Likewise, if the part 1-42 turns, for example, red, the part 1-42 would be atomic and has no subassembly image(s). If, on the other hand, the part 1-42 does not change colors as the pointer moves over it, the part 1-42, in this embodiment, would not be available for sale.

In another embodiment, the color is also used to inform the consumer whether additional information exists about the product. For example, the color can signal the availability of discounts, related products, alternative packaging, sizes, colors and the like for the product, minimum order requirements, comments from other customers or consumer activist groups, and the like.

Order panel 420 also contains several buttons or links that can be optionally included. As it would be apparent to one skilled in the relevant art(s), a button is an icon that is intended to represent an electrical push-button appearing as part of the GUI. Generally, using an input device (i.e., mouse) to move a pointer over the graphical button and click on the button would start some type of software action. Referring again to FIG. 4, order panel 420 includes a help button 424, search button 426 and order placement button 428. Help button 424 opens a new window with, for example, a web page specified by the image key. Help button 424 enables the consumer to receive real time, online information about using a particular feature of the electronic shopping session. Server 120 supports both general and context sensitive help requests. For example, in response to a help request, server 120 can send to the respective consumer an index of all keywords or topics related to the electronic shopping session. Alternatively, server 120 can filter the index to send only information related to the context of the current electronic shopping session. In an embodiment, the entire help file, a portion of the help file, is sent as an explodable file to the client workstation with the initialization packet. In this embodiment, all help queries are processed locally.

Search button 426 also loads a page specified by the image key. The page provides the consumer with the option of sending a request to catalog selector 136 to search for a specific merchandise item. In an embodiment, the shopping session is temporarily suspended while a search is being performed. After the search is completed, the shopping session resumes. In another embodiment, the shopping session is terminated by e-sessions controller 128, but all of the session data is logged in the consumer's profile stored in consumer database 148. After the search is completed in this embodiment, e-sessions controller 128 reinitiates the shopping session by loading the last visited page, including any items placed in order panel 420. Order placement button 428, however, is not optional and submits the contents of order panel 420 to a location specified by the order panel key.

Referring to FIG. 5, order panel 420 in another embodiment includes back button 522 (shown in hatched lines to illustrate that a section of order panel 420 is obscured by merchandise image 410), redraw button 524 and cart float button 526. Back button 522 changes the image map to the item that was displayed in merchandise image 410 before the current item. Each time back button 522 is activated, it continues to go back into the display history until the first item displayed is reached. Redraw button 524 can be used to remove all items that have been added to order panel 420. Cart float button 526 toggles order panel 420 to move it between two positions on GUI 500 when the pointer is moved over the border of order panel 420 without dragging something out. When cart float button 526 is not activated, order panel 420 remains stationery.

Referring back to FIG. 2, client electronic sessions system 200 also includes order initiator 244. Order initiator 244 signals order processor 140 (shown in FIG. 1) to generate a facsimile of the consumer's order panel 420 on electronic shopping server 120. The session number is posted on the server-side order panel to match it with order panel 420. In an embodiment, when order panel generator 240 creates order panel 420 on the client display, order initiator 244 transmits a request to create a facsimile of order panel 420 on server 120 at a location specified by the order panel key. In an embodiment, order processor 140 maintains each consumer's order panel 420 as part of a multithreaded Java application that manages the input of data from each client workstation through a unique socket. In another embodiment, order processor 140 manages each consumer's order panel 420 as a thread in a Java application in orders databank 156.

As shown in FIG. 2, client electronic sessions system 200 also includes item adder 248. Item adder 248 interacts with the API input device, descriptive data generator 236 and order panel key to add items to order panel 420 and the server-side order panel. Similarly, item remover 252 interacts with the input device, descriptive data generator 236 and order panel key to remove items from order panel 256 and the server-side order panel. As discussed above, merchandise image 410 (shown in FIG. 4) is an image map containing one or more links or anchors to another image, image map, web page, web site, and the like. In FIG. 4, each part 1-42 can be a link. Activating this link not only can request additional information about each part 1-42, but can also send the respective part 1-42 to order panel 420. In an embodiment, the consumer double-clicks on the part 1-42 to send it to order panel 420. In another embodiment, the consumer uses an input device (e.g., mouse or the like) to drag and drop the part 1-42 to order panel 420. In this embodiment, the consumer would use, for example, a mouse to click on the part 1-42 and, holding the mouse button down, drag the part 1-42 over to order panel 420. The image representing the part 1-42 would be shown as being dragged over to order panel 420 along with the mouse pointer. The consumer can also use the input device to select multiple parts 1-42 to be dragged and dropped into order panel 420 at the same time. As it would be apparent to a person skilled in the relevant art(s), other techniques can be used to activate the links represented by parts 1-42, including, but not limited to, left-clicking, pull-down menus, touch screen signals, voice commands, and the like, and would not change the scope of the present invention.

As discussed above, once a part 1-42 has been placed into order panel 420, the name, price and quantity for the selected part 1-42 would appear in order panel 420. In an embodiment, descriptive data generator 236 provides the data by reading a local file containing the corresponding merchandise data. Therefore, local sessions controller 228 need not query server 120 to modify the contents of order panel 420.

In another embodiment, however, the order panel key enables local sessions controller 228 to retrieve the data from the appropriate location on server 120. This embodiment enables order panel 420 to receive the latest available pricing information.

The consumer can alter the quantity value in order panel 420 by clicking on the quantity field and using, for example, a keyboard to indicate the desired value. Alternatively, the consumer can drag and drop the selected part 1-42 multiple times into the order panel 420 to increase the quantity. Moreover, the same techniques described above to add parts 1-42 can be used to increase the quantity (i.e., double-clicking, left-clicking, pull-down menus, touch screen signals, voice commands, and the like).

To remove or decrease the quantity of parts 1-42 from order panel 420, the consumer can use the same techniques (i.e., double-clicking, left-clicking, drag and drop, pull-down menus, touch screen signals, voice commands, and the like). After posting the add or remove transaction(s) to the server-side order panel (regardless of the activation technique), order processor 140 transmits a confirmation signal to item adder 248 or item remover 252, as appropriate, to indicate that the transaction has been completed.

Order executor 256 places the order when the consumer activates order placement button 428. In an embodiment, order executor 256 authenticates the consumer's order by searching for synchronization problems prior to placing the order. In this embodiment, order executor 256 can query item adder 248 and item remover 252 to detect if any add or remove requests have not been confirmed as being completed by server 120. Alternatively, item adder 248 and item remover 252 can be programmed to automatically alert order executor 256 if an add/remove request is not confirmed within a specified time frame. Additionally, order executor 256 can be programmed to search for synchronization problems without regard to expected returns to item adder 248 or item remover 252. To effect the synchronization process in this embodiment, order executor 256 sends a second facsimile of order panel 420 to a location on server 120 that is specified by order panel key. Order processor 140 (shown in FIG. 1) would compare the version sent by order executor 256 with the server-side order panel already located on server 120. If the contents of both order panels are consistent with each other, order processor 140 signals order executor 256 that order panel 420 has been authenticated. Otherwise, order processor 140 would inform order executor 256 that an error has occurred. In this case, order executor 256 can be programmed to prompt the consumer to confirm or modify the order as stipulated in order panel 420, as desired. Alternatively, if the order panels are inconsistent with each other, order processor 140 can be programmed to ignore the server-side order panel and use only the version sent by order executor 256, with or without confirmation from the consumer. At any rate, order processor 140 would eventually place the order by routing it to the appropriate vendor.

As discussed, in an embodiment, electronic sessions system 200 is designed to create a duplicate list of items selected by the consumer (shown in order panel 420) and synchronize the duplicate list with the list shown in order panel 420. In an embodiment, the duplicate list is maintained on server 120 as described above. However, in another embodiment, the duplicate list can be stored in the resident memory of the consumer's client workstation. In this embodiment, the initialization packet would include instructions to create, update and synchronize the two shopping lists on the client workstation. Thus, item adder 248, item remover 252 and order executor 256 would likewise be instructed to exchange communications with the duplicate shopping list in lieu of order processor 140.

In another embodiment, electronic sessions system 200 can be configured to exclude the shopping list redundancy and synchronization features. In this embodiment, a facsimile of order panel 420 is not generated and maintained on either server 120 or the consumer's client workstation. Accordingly, in this alternate embodiment, electronic sessions system 200 would not include order initiator 244. As the consumer operates the input device (e.g., mouse) to alter the contents of order panel 420, item adder 248 and item remover 252 would operate to add and remove the items in order panel 420 and adjust the pricing and quantity as previously discussed. Upon activation of order placement button 428, order executor 256 would send the contents of order panel 420 to order processor 140 to be placed with the vendor. Alternatively, order executor 256 can send the order directly to the vendor. Therefore, electronic orders can be implemented on the client workstation without having to query electronic shopping server 120. In an embodiment, order executor 256 can generate a dialog box to prompt the consumer to confirm the order prior to being sent to order processor 140.

As discussed above and as shown in FIG. 2, electronic sessions system 200, in an embodiment, comprises a Java application, or the like, that is routed to the client workstation. In this embodiment, electronic shopping server 120 sends all of the system 200 components to the client workstation. However, in another embodiment (not shown), only local sessions controller 228 can be sent to the client workstation and the remaining system 200 components, namely image generator 232, descriptive data generator 236, order panel generator 240, order initiator 244, item adder 248, item remover 252 and order executor 256, can be resident on electronic shopping server 120. In this alternative embodiment, e-sessions controller 128 would send the sessions parameters (e.g., a session number, local code, tax/shipping code, image key and order panel key) to a location (not shown) within server 120 to create the resident system 200 components for each consumer session. The instructions for generating and managing the format and contents of GUI 400 or GUI 500 would be sent to local sessions controller 228 in real time over computer network 110. As such, in this embodiment, local sessions controller 228 acts a steward for implementing the commands from server 120.

The above embodiments of systems 100 and 200 have been presented as examples for implementing the present invention. It would be apparent to a person skilled in the relevant art(s) that alternative arrangements and configurations of system 200 can be implemented and would not change the scope of the present invention. In other words, for example, local sessions controller 228, image generator 232 and descriptive data generator 236 can be located on the client workstation and the remaining system 200 components (i.e., order panel generator 240, order initiator 244, item adder 248, item remover 252 and order executor 256) can remain on server 120, and like arrangements and combinations of server-client components.

In another embodiment, client electronic sessions system 200 can be a software application stored on computer useable storage medium. For example, local sessions controller 228, image generator 232, descriptive data generator 236, order panel generator 240, order initiator 244, item adder 248, item remover 252 and order executor 256 can be software components stored on a CD ROM loaded onto the client workstation. In this embodiment, when local sessions controller 228 is launched, a request is sent over computer network 110 to update the files and programs resident in system 200. System 200 would then load and manage a shopping session as discussed above, except all images and supporting data would be read from a local file instead of being routed over computer network 110. In an embodiment, a duplicate order panel is maintained on server 120 or the consumer's client workstation to support synchronization. In another embodiment, however, no order panel duplication or synchronization is provided.

III. Software and Hardware Embodiments

The present invention (e.g., electronic shopping system 100, client electronic sessions system 200, electronic shopping server 120, sessions repository 144, consumer database 148, catalog repository 152, orders databank 156, local sessions controller 228, or any part thereof) can be implemented using hardware, software or a combination thereof and can be implemented in one or more computer systems or other processing systems. In fact, in an embodiment, the invention is directed toward one or more computer systems capable of carrying out the functionality described herein.

Figure 3:
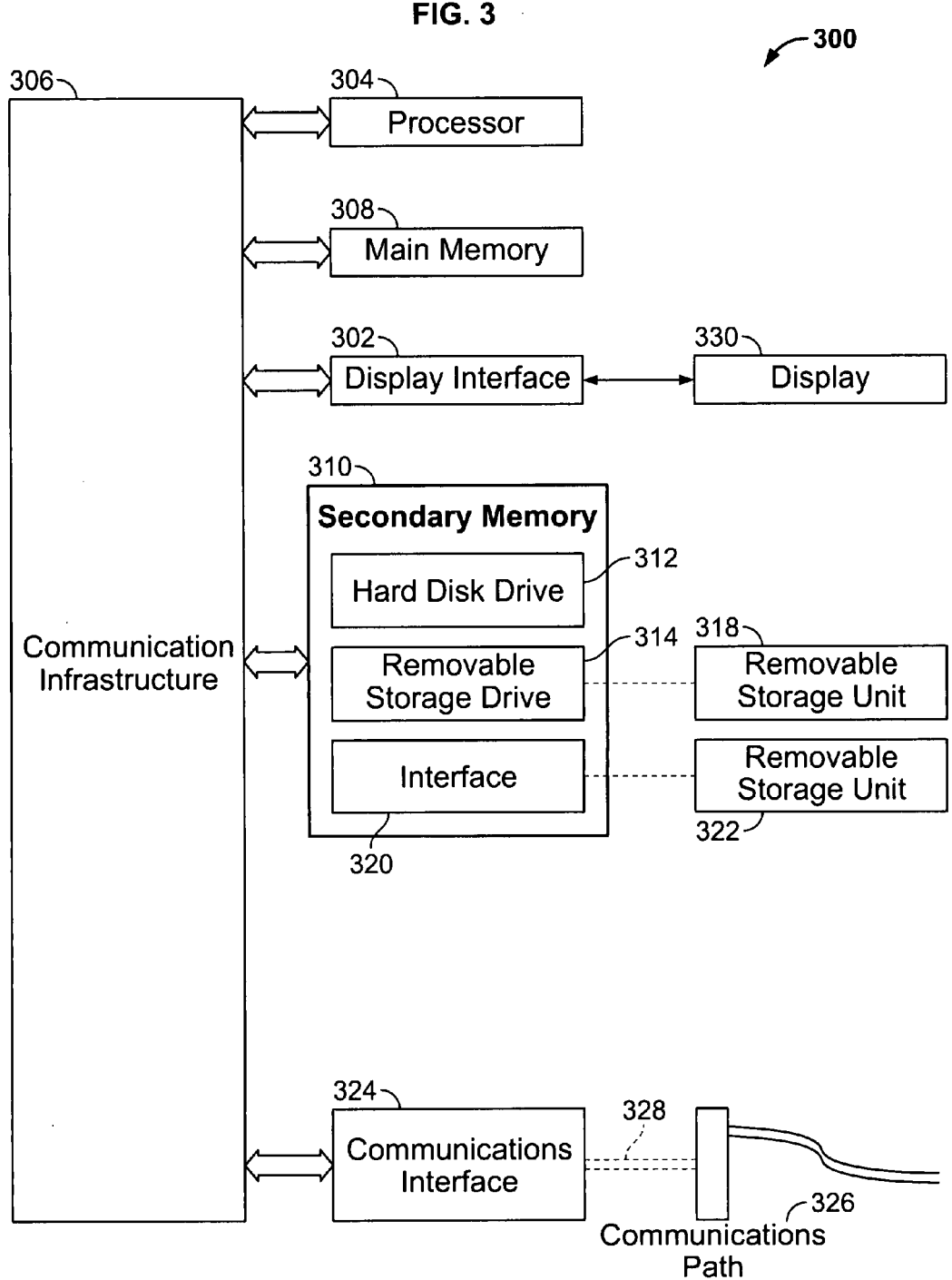
FIG. 3 illustrates a block diagram of an example computer system useful for implementing the present invention.

Referring to FIG. 3, an example computer system 300 useful in implementing the present invention is shown. The computer system 300 includes one or more processors, such as processor 304. The processor 304 is connected to a communication infrastructure 306 (e.g., a communications bus, crossover bar, or network). Various software embodiments are described in terms of this exemplary computer system. After reading this description, it will become apparent to a person skilled in the relevant art(s) how to implement the invention using other computer systems and/or computer architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc. which is read by and written to removable storage drive 314. As will be appreciated, the removable storage unit 318 includes a computer usable storage medium having stored therein computer software and/or data.

In alternative embodiments, secondary memory 310 can include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals 328 which can be electronic, electromagnetic, optical or other signals capable of being received by communications interface 324. These signals 328 are provided to communications interface 324 via a communications path (i.e., channel) 326. This channel 326 carries signals 328 and can be implemented using wire or cable, fiber optics, a phone line, a cellular phone link, an RF link and other communications channels.

In this document, the terms "computer program medium" and "computer usable medium" are used to generally refer to media such as removable storage drive 314, a hard disk installed in hard disk drive 312, and signals 328. These computer program products are means for providing software to computer system 300. The invention is directed to such computer program products.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software can be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Exemplary Electronic Shopping Session

Figure 6:
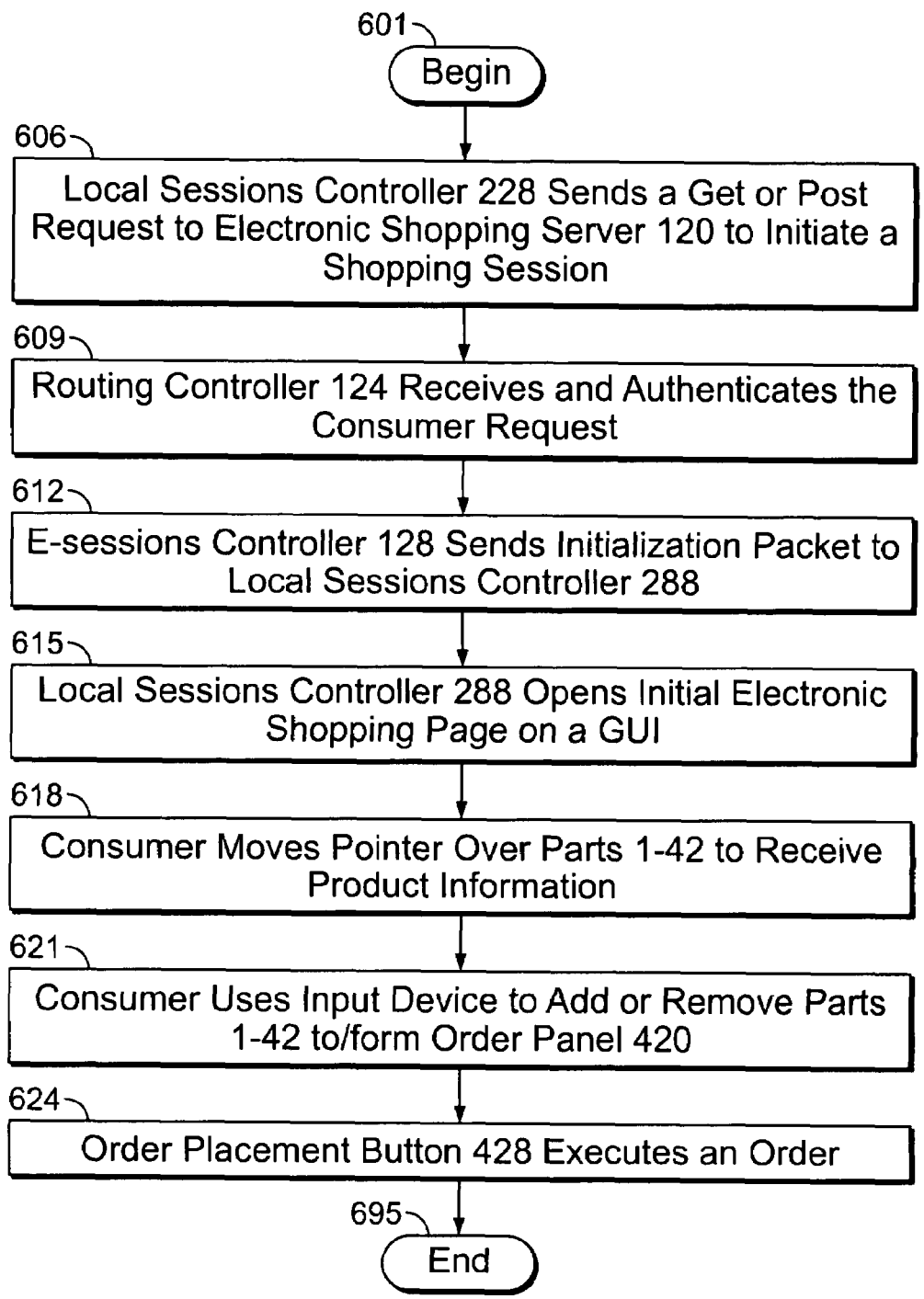
FIG. 6 illustrates a high-level operational flow diagram for the steps involved in generating and placing orders over a computer network according to an embodiment of the present invention.

Referring to FIG. 6, flowchart 600 represents the general operational flow of an embodiment of the present invention. More specifically, flowchart 600 shows an example of a control flow for generating and placing orders for merchandise over computer network 110.

Referring to FIG. 6, the control flow of flowchart 600 begins at step 601 and passes immediately to step 606. At step 606, a consumer, using a client workstation, visits a web site or launches a client application to start an electronic shopping session. As a result, a resident local sessions controller 228 sends a data packet containing a get or post request to electronic shopping server 120. As discussed, local sessions controller 228 can be part of the application (e.g., Java applet or the like) sent to the client workstation to open the home page for a web site, it can be sent in response to a hyperlink activated from a web page, it can be part of a computer program loaded onto the client workstation from, for example, a disk drive, or the like.

At step 609, route controller 124 receives the data packet request and reads the header frame(s) to detect that the data packet is destined for e-sessions controller 128, which is responsible for initiating and managing electronic shopping sessions. In an embodiment, prior to sending the data packet to e-sessions controller 128, route controller 124 coordinates activities with profile generator 132 to determine or authenticate the identity of the requesting consumer. Electronic shopping server 120 can be configured to support passive and active registering techniques to determine the consumer's identity. For example, in an embodiment, profile generator 132 can send a Java applet, or the like, to the consumer's client workstation to prompt the consumer for a username and password (or to create a username/password if it is the consumer's first shopping session). In another embodiment, profile generator 132 can determine the consumer's identity by reading a cookie deposited on the consumer's client workstation or the IP address located in the header frames of the data packet request. After profile generator 132 determines the consumer's identity, profile generator 132 establishes a consumer profile by either querying the consumer, search engines, databases, profiling engines, and the like.

After profile generator 132 establishes the consumer profile, e-sessions controller 128 creates an initialization packet containing instructions to start a shopping session on the consumer's client workstation. At step 612, e-sessions controller 128 sends the initialization packet to local sessions controller 228. Based on the consumer's profile, the initialization packet would be formatted to be compatible with the consumer's client workstation. In an embodiment, the initialization packet includes a session number used to track the consumer's visit to server 120, local code and tax/shipping code used to determine the consumer's tax, shipping and handling expenses, image key used to determine which pages from an electronic catalog would be sent to the consumer, and order panel key used to purchase merchandise advertised in the electronic catalog. In an embodiment, e-sessions controller 128 compresses and encrypts the initialization data packet before it sends the data packet to local sessions controller 228.

At step 615, local sessions controller 228 receives, decompresses and reads the instructions from the initialization data packet. As a result, a browser application displays an image of a page from the electronic shopping catalog on a GUI. In an embodiment the catalog page includes an image map of the product that is being advertised and a shopping basket that can be used to order the parts. Referring back to FIG. 4, an embodiment of the catalog page is shown as GUI 400. As discussed, the initial contents of GUI 400 are determined by the image and order panel keys. In an embodiment the files sent from server 120 are saved in CSV ASCII format using Windows® codes for new lines. For example, the first line would contain column header information. Cells containing " or, would be contained in quotes. Quotes can be contained in the cell contents by doubling them. For instance, the value " is represented in a cell by """". The value 5" is representing in a cell by "5"". Cells containing """" would be an error and the entire row would be ignored. Every row would contain every column specified by the header or it would be ignored. No quotes or commas are allowed in the header cells. Accordingly, in this embodiment, a data packet containing a CSV file for an image map can include the part name of each part 1-42; color code for determining the color of the part 1-42 when the pointer moves over it; SKU used to identify the part 1-42 when placing an order; local coordinate used to match the URL field in the image map for the parts explosion drawing; price of each part 1-42; subassembly image key specifying the location, on server 120 or the client workstation, of subassembly image maps, if appropriate; and the like.

At step 618, the consumer can use a mouse or like input device to move a pointer over the individual parts 1-42. As the pointer passes over the part 1-42, several types on information can be presented to the consumer. For example, in an embodiment, the parts 1-42 change color as the pointer moves over them. If one of the parts 1-42 changes to blue, the part 1-42 serves as a link to another parts explosion image of a subassembly. Activating or clicking on the part 1-42 would cause the browser to load an image map of the subassembly. If one of the parts 1-42 changes to red, the part 1-42 does not have a subassembly image. Additionally, as the pointer moves over the parts 1-42, descriptive information (i.e., product name and/or price) about the part 1-42 is displayed in descriptive data panel 430 if description tab 436 is activated, or referring to FIG. 5, in status window 520.

At step 621, the consumer can request to order one or more parts 1-42 by placing the items in the shopping basket shown as order panel 420. Using the mouse or like input device, the consumer can select a part 1-42 by clicking on it and holding down the mouse button while dragging the part 1-42 over to order panel 420. Electronic sessions system 200 also supports double-clicking and like techniques for selecting a part 1-42 and sending it to order panel 420. Once the part 1-42 has been sent to order panel 420, an ordered list would be created showing for example, the name, SKU, quantity, sales price and like information for the part 1-42. In an embodiment, item adder 248 queries descriptive data generator 236 to retrieve this information from a resident merchandise data file. In another embodiment, however, item adder 248 retrieves this information from the appropriate location on server 120 as specified by the order panel key. In this embodiment, each time a price is returned to the consumer's client workstation, the price is applied to all parts 1-42 having the same SKU, even if the previously returned price is different. In an embodiment, order panel 420 also calculates the tax, shipping and handling expenses from the order panel key provided in the initialization data packet.

Referring back to FIG. 2, in an embodiment, a Java, or the like, application provided by order initiator 244 creates a facsimile of order panel 420 on electronic shopping server 120 or the consumer's client workstation, as discussed above. Each time a part 1-42 is added to or removed from order panel 420, item adder 248 or item remover 252 sends a data packet to server 120 to update the server-side shopping basket or client backup shopping basket.

At step 624, the consumer places the order by activating order placement button 428. In an embodiment, order executor 256 synchronizes order panel 420 with the contents of the server-side shopping basket. If any discrepancies are found, order executor 256 gives the consumer the option of correcting and confirming the order. Otherwise, the order is placed and a confirmation message is sent to the consumer. At this point the electronic shopping session terminates and the control flow ends as indicated by step 695.

V. Cyber-Trekking Shopping Sessions

Figure 7:
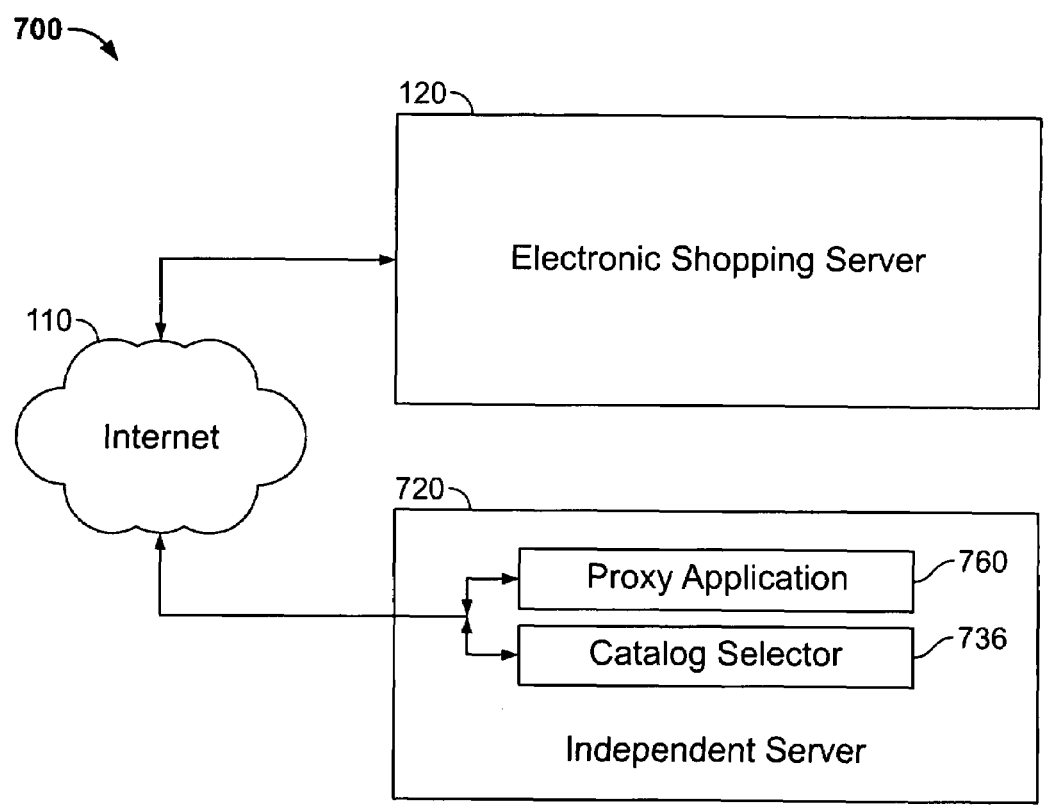
FIG. 7 illustrates a high-level block diagram of a second embodiment of an electronic shopping system.

FIG. 7 illustrates another embodiment of the systems and methods of present invention (shown as system 700) that permits a consumer to visit other web sites while the consumer continues to utilize a shopping basket (e.g., order panel 420) generated by electronic shopping server 120. The shopping basket would appear to travel with the consumer as the consumer visits other web sites. Accordingly, the consumer can browse and purchase products on a plurality of different web sites, and maintain the traveling shopping basket on the same display with the advertised goods or services.

The traveling shopping basket can be created in a variety of ways. In an embodiment, the consumer can initiate a shopping session with electronic shopping server 120. As discussed above, the consumer's client workstation would receive an initialization packet to create, for example, GUI 400 that contains order panel 420 as shown in FIG. 4. If, at this point, the consumer transmits a URL request for a web site from another web server, e-sessions controller 128 (shown in FIG. 1) would send a Java applet, or the like, to create a dialog box to inform the consumer that the current shopping session with electronic shopping server 120 would be terminated. If the consumer indicates that the current session should not be terminated, e-sessions controller 128 would maintain the connection with the consumer's client workstation and the shopping session would continue.

If, however, the consumer indicates that the shopping session should be terminated, e-sessions controller 128 would give the consumer the option of archiving the order panel 420 for future shopping sessions. Therefore, when the consumer reinitiates the shopping session with electronic shopping server 120, the contents of order panel 420 would be available. Thus, in an embodiment, the contents are stored in order databank 156, consumer database 148 or like storage mediums or units communicating with electronic shopping server 120. In another embodiment, the contents are stored on similar storage mediums or units on the client. In this embodiment, local sessions controller 228 would prompt the consumer about archiving the order panel 420 for future shopping sessions.

As an alternative to archiving order panel 420, in an embodiment, e-sessions controller 128 gives the consumer the option of retaining order panel 420 on the consumer's browser screen. This would enable the consumer to continue to use order panel 420 while the consumer browses other e-commerce web sites. In this embodiment, the consumer initiates a browsing session with an independent server 720 and proceed to shop for merchandise on the web site hosted by independent server 720. It should be noted that independent server 720 can be owned or operated by the same merchant that owns or operates electronic shopping server 120, or independent server 720 can be owned or operated by a third party source.

Referring again to FIG. 7, independent server 720 has components comparable to electronics shopping server 120 to permit the consumer to purchase merchandise over computer network 110. In particular, independent sever 720 includes catalog selector 736 that functions similarly to catalog selector 136. As such, catalog selector 736 provides images or supporting data to GUI 400 to permit the consumer to evaluate various goods or services. If the consumer desires to purchase any of the merchandise, the consumer can operate an input device to update order panel 420 to add, or remove as appropriate, the merchandise. Thus, catalog selector 736 provides product names, pricing data and the like to complete the fields in order panel 420. In this embodiment, independent server 720 also provides instructions to order panel 420 to indicate the IP address for placing an order with the appropriate vendor. The IP address can be the address of independent server 720 or another server operated by another vendor or distributor for the advertised merchandise.

In another embodiment, the consumer can initiate a shopping session on independent server 720 in lieu of electronic shopping server 120. Independent server 720 would provide an option for using the traveling shopping basket stored on electronic shopping server 120 or the client workstation. Accordingly, in an embodiment, the web pages streamed from independent server 720 includes a hyperlink to electronic shopping server 120. Upon activation of the hyperlink, route controller 124 (shown in FIG. 1) would signal profile generator 132 to authenticate the consumer, as discussed above, and e-sessions controller 128 would instruct order processor 140 to provide the initialization instructions for creating order panel 420 as a traveling shopping basket. In another embodiment, the web pages from independent server 720 includes links to instruct the client browser to load the traveling shopping basket stored on the client workstation. Order panel 420 would operate as described above, except independent server 720 would provide content for order panel 420, with instructions for placing any resultant orders with the appropriate IP address.

As discussed above in reference to the client components, part or all of the application for managing order panel 420 (i.e., order initiator 244, item adder 248, item remover 252, and order executor 256) can be resident on the consumer's client workstation or electronic shopping server 120. If part or all of the order panel applications are resident on electronic shopping server 120, in an embodiment, a proxy application 760 is used to maintain simultaneous sessions with both independent server 720 and electronic shopping server 120. Referring again to FIG. 7, proxy application 760 would broker communications between order processor 140 (shown in FIG. 1) and order panel 420 residing on the consumer's display.

If, in another embodiment, all order panel applications reside on the consumer's client workstation, proxy application 760 is only activated to place the order with order processor 140. Moreover, system 700 can be configured to generate a duplicate order panel on electronic shopping server 120, or on the client workstation, and support synchronization as discussed above. However, as discussed above, in an embodiment, order executor 256 is instructed to place the order directly with the vendor without having to communicate with order processor 140. Therefore, in this embodiment, proxy application 760 is an optional component of independent server 720 if there is no need to communicate with electronic shopping server 120. FIG. 7 has been presented by way of example. Proxy application 760 could also be sent, as a Java applet or the like, to the consumer's client workstation to broker communications with electronic shopping server 120, as required. Accordingly, other configurations and arrangements of the system components are within the scope of the present invention.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. A method of permitting a user to order merchandise on a client computer that communicates with a server, the server responding to on-demand requests for a Web page containing promotional items of merchandise, wherein the server sends to the client computer the Web page and an auxiliary file containing descriptive data related to the promotional items, comprising:

receiving, at the client computer, the Web page and the auxiliary file, to produce a graphical depiction of one or more promotional items on a graphical user interface coupled to the client computer and configured to receive input from the user;

displaying descriptive data related to at least one of the promotional items in response to a request from the user, wherein the descriptive data is read from the auxiliary file in response to the request from the user without further accessing and querying said server and displayed with the graphical depiction on said graphical user interface; and sending the descriptive data related to one of the promotional items to a selection panel in response to a selection request from the user, wherein the selection panel is displayed with the graphical depiction on said graphical user interface, wherein said sending is implemented by the client computer reading the auxiliary file and without accessing and querying the server for the descriptive data to be sent.

2. A method of claim 1, wherein said displaying descriptive data is implemented in response to a pointer linked to an input device being moved over one of the promotional items.

3. A method of claim 2, further comprising altering the hue, saturation, brightness or lightness of the promotional item in response to the pointer being moved over the promotional item, wherein said altering indicates the availability of at least one of a subassembly image of the promotional item, discounts, related items, alternative packaging, alternative sizes, alternative colors, minimum order requirements, and comments from other customers or consumer activist groups.

4. A method of claim 1, wherein said sending descriptive data is implemented in response to an input device being operated to drag and drop the promotional item into the selection panel.

5. A method of claim 1, wherein said sending descriptive data is implemented in response to an input device being operated to click on the promotional item.

6. A method of claim 1, further comprising providing a window containing a subassembly of one of the promotional items in response to an input device being operated to click on the promotional item, wherein the subassembly comprises a plurality of additional promotional items having related descriptive data and capable of being sent to the selection panel.

7. A method of claim 1, further comprising sending a purchase request to the server to purchase the promotional item sent to the selection panel, wherein said sending a purchase request is implemented in response to an order request from the user.

8. A method of claim 7, wherein said sending a purchase request further comprises synchronizing the selection panel with a duplicate of the selection panel located on the server.

9. A method of claim 1, wherein said sending descriptive data further comprises waiting to receive a confirmation signal, from the server, to verify the promotional item has been added to a duplicate panel of the selection panel.

10. A method of claim 1, further comprising deleting a promotional item from the selection panel in response to an input device being operated to drag said promotional item out of the selection panel.

11. A method of claim 1, wherein said receiving to produce a graphic depiction further comprises producing a parts explosion image of the promotional item as the graphic depiction, wherein each part within the image represents a component of the promotional item.

12. A method of claim 1, wherein said sending descriptive data further comprises sending the descriptive data to a selection panel providing a metaphorical representation of a shopping cart, shopping basket or trolley.

13. A method of permitting a user to view and interact with an electronic shopping catalog on a client computer, comprising the steps of:
  generating instructions to display an interactive image of a catalog page from the electronic shopping catalog, wherein said generating includes formatting the instructions to match the configuration requirements of the client computer;
  appending to the instructions an auxiliary file containing descriptive data related to promotional items of merchandise associated with the catalog page; and
  sending the instructions over the Internet to the client computer, to command the client computer to produce a graphical depiction of one or more promotional items, on a graphical user interface coupled to the client computer and configured to receive input from the user;
  displaying descriptive data related to at least one of the promotional items, with the graphical depiction on the graphical user interface by accessing said auxiliary file, in response to a request from the user, without further accessing and querying a server sending said catalog page for the descriptive data;
  reading the auxiliary file, at the client computer without accessing and querying said server sending said catalog page for descriptive data to be sent, and sending the descriptive data related to one of the promotional items to a selection panel in response to a selection request from the user, without accessing and querying the server for the descriptive data; and
  displaying the selection panel with the graphical depiction on said graphical user interface.

14. A system for permitting a user to order merchandise on a client computer, said client computer programmable to send requests to a server for a Web page containing promotional items of merchandise and an auxiliary file containing descriptive data related to the promotional items, comprising:
  a computer processor executing code including:
  an image generator to produce a graphical depiction of one or more promotional items on a graphical user interface coupled to said client computer, in accordance with a received Web page;
  a descriptive data generator to display descriptive data related to one of said promotional items in response to a pointer linked to an input device being moved over said promotional item by the user, wherein said descriptive data is read from the auxiliary file at the client computer in response to the pointer and displayed with said graphical depiction on said graphical user interface, without further accessing and querying said server for the descriptive data; and
  an order panel generator to produce a selection panel on said graphical user interface, wherein said selection panel compiles a list of said promotional items that are sent to said selection panel in response to a selection request, wherein said list is produced by querying the auxiliary file for descriptive data corresponding to said list without accessing and querying the server for said corresponding descriptive data to be sent.

15. A system of claim 14, wherein said image generator alters the hue or lightness of one of said promotional items in response to said pointer being moved over said promotional item, wherein the hue or lightness indicates the availability of at least one of a subassembly image of said promotional item, discounts, related items, alternative packaging, alternative sizes, alternative colors, minimum order requirements, and comments from other customers or consumer activist groups.

16. A system of claim 14, wherein said order panel generator displays said selection panel with said graphical depiction on said graphical user interface.

17. A system of claim 14, the code further comprising:
  an order executor to send a request to the server to purchase said promotional items sent to said selection panel, wherein said purchase request is sent in response to an order request from the user; and
  an order initiator to produce a duplicate selection panel on the server, wherein entries or deletions of said promotional items in said selection panel sends a request for entries or deletions of said promotional items in said duplicate selection panel, wherein said purchase request from said order executor causes the server to synchronize said duplicate selection panel with said selection panel.

18. A system for permitting a user to view and interact with an electronic shopping catalog provided by a server on a client computer, comprising:
  a computer processor on the server executing code including:
  an e-sessions controller to generate instructions to display an interactive image of a catalog page from the electronic shopping catalog, wherein said instructions include an auxiliary file containing descriptive data related to promotional items of merchandise on said catalog page, wherein said instructions are formatted to match the configuration requirements of the client computer; and
  a route controller to send the instructions over the Internet to the client computer to produce an image generator to produce a graphical depiction of one or more promotional items on a graphical user interface coupled to the client computer; and
  a computer processor on the client computer executing code including:
  a descriptive data generator to generate descriptive data related to one of said promotional items in response to a pointer linked to an input device being moved over said promotional item on the graphical depiction by the user, wherein said descriptive data is displayed with said graphical depiction on said graphical user interface by reading said auxiliary file in response to the pointer without further accessing and querying said server; and
  an order panel generator to produce a selection panel on said graphical user interface, wherein said selection panel compiles a list of said promotional items that are sent to said selection panel in response to a selection request at the client computer without accessing and querying said server, wherein said descriptive data generator reads said auxiliary file to provide descriptive data corresponding to said list, without accessing and querying the server for said corresponding descriptive data.

19. A system of claim 18, the code further comprising a catalog selector to receive a request for contents of said catalog page and send instructions to display said contents on said graphical user interface.

20. A system of claim 18, on the server further comprising an order processor to receive requests from the client computer to purchase said promotional items sent to said selection panel.

21. A system of claim 18, wherein said image generator alters the hue or lightness of one of said promotional items in response to said pointer being moved over said promotional item, wherein the hue or lightness indicates the availability of at least one of a subassembly image of said promotional item, discounts, related items, alternative packaging, alternative sizes, alternative colors, minimum order requirements, and comments from other customers or consumer activist groups.

22. A computer program product comprising a computer useable medium having computer readable program code embedded in said medium for causing an application program to execute on a computer that communicates with a server and permits a user to order merchandise on the computer, wherein the computer is programmable to send requests to a server for a Web page containing promotional items of the merchandise and an auxiliary file containing descriptive data related to the promotional items, said computer readable program code comprising:
    a first computer readable program code for causing the computer to produce a graphical depiction of one or more promotional items on a graphical user interface coupled to the computer;
    a second computer readable program code for causing the computer to display descriptive data related to one of said promotional items in response to a pointer linked to an input device being moved over said promotional item on said graphical depiction, wherein said descriptive data is read from the auxiliary file at said computer in response to the pointer without further accessing and querying said server and displayed with said graphical depiction on said graphical user interface; and
    a third computer readable program code for causing the computer to display a selection panel on said graphical user interface with said graphical depiction in response to a selection request, wherein said selection panel compiles the editable list of said promotional items that are sent to said selection panel in response to a selection request, wherein said editable list is produced by querying the auxiliary file for descriptive data corresponding to said editable list at the computer without accessing and querying the server for said corresponding descriptive data.

23. A computer program product according to claim 22, wherein said first computer readable program code further causes the computer to alter the hue or lightness of one of said promotional items in response to said pointer being moved over said promotional item, wherein the hue or lightness indicates the availability of at least one of a subassembly image of said promotional item, discounts, related items, alternative packaging, alternative sizes, alternative colors, minimum order requirements, and comments from other customers or consumer activist groups.

24. A computer program product according to claim 22, further comprising a fourth computer readable program code for causing the computer to send a request to the server to purchase said promotional items sent to said selection panel, wherein said purchase request is sent in response to an order request from the user.

25. A computer program product according to claim 24, further comprising a fifth computer readable program code for causing the computer to produce a duplicate selection panel on the server, wherein entries or deletions of said promotional items in said selection panel sends a request for entries or deletions of said promotional items in said duplicate selection panel, wherein said purchase request from said fourth computer readable program code causes the server to synchronize said duplicate selection panel with said selection panel.

26. A method of permitting a user to order merchandise on a client computer that communicates with a plurality of servers, said servers sending Web pages containing one or more promotional items of merchandise and said servers sending an auxiliary file for each Web page to provide descriptive data corresponding to the promotional items, comprising:
    receiving, from a first server, a first graphical depiction of a first promotional item and a first auxiliary file corresponding to the first promotional item in response to a request for the first promotional item;
    displaying the first graphical depiction on a graphical user interface that is coupled to the client computer and configured to receive input from the user, wherein said displaying is implemented in response to the user requesting to view the first promotional item;
    displaying a first descriptive data related to said first promotional item by reading said first auxiliary file in response to a request to view the first descriptive data, without further accessing and querying the first server for the first descriptive data;
    receiving, from a second server, a second graphical depiction of a second promotional item and a second auxiliary file corresponding to the second promotional item in response to a request for the second promotional item;
    displaying the second graphical depiction on the graphical user interface, wherein said displaying of the second graphical depiction is implemented in response to the user requesting to view the second promotional item;
    displaying a second descriptive data related to said first promotional item by reading said second auxiliary file in response to a request to view the second descriptive data, without further accessing and querying said second server for the second descriptive data; and
    receiving, from the first server, a selection panel application instructing the client computer to display, on the graphical user interface, a selection panel with one of the first graphical depiction or the second graphical depiction, and instructing the client computer to read and send descriptive data from the auxiliary file corresponding to at least one of the promotional items from the first graphical depiction or the second graphical depiction to the selection panel on said graphical user interface in response to a selection request from the user, without further accessing and querying the server for the descriptive data to be sent to said selection panel.

27. A method of 26, wherein said receiving a selection panel further comprises receiving instructions for the selection panel application to remain actively operable on the client computer during said receiving a second graphical depiction, whereby the client computer is instructed to display the selection panel with the second graphical depiction and to read and send descriptive data from the second auxiliary file.

28. A method of 26, further comprising:
    storing the selection panel application to a memory disposed on one of the client computer or the first server prior to said receiving a second graphical depiction, wherein said receiving a selection panel application includes receiving the selection panel application from the memory, whereby the client computer is instructed to display the selection panel with the second graphical depiction and to read and send descriptive data from the second auxiliary file.

29. A method of 26, further comprising:
wherein said receiving a second graphical depiction includes maintaining an active connection between the client computer and the first server to continue an interactive session with the first server while the client computer displays the selection panel with the second graphical depiction and reads and sends descriptive data from the second auxiliary file.

30. A system for permitting a user to order merchandise on a client computer that communicates with two or more servers, said servers sending Web pages containing one or more promotional items of merchandise and said servers sending an auxiliary file for each Web page to provide descriptive data corresponding to the promotional items located thereon, comprising:
a computer processor executing code including:
a local sessions controller to receive, from a server, a graphical depiction of a promotional item and an auxiliary file corresponding to said promotional item, wherein said graphical depiction and said auxiliary file are received in response to a request for said promotional item;
an image generator to display said graphical depiction on a graphical user interface coupled to said client computer;
a description generator to display description data related to the promotional item by reading such description data from said auxiliary file in response to a request to display such description data, without accessing and querying the server sending said graphical depiction of the promotional item and the auxiliary file; and
an order panel generator to display a selection panel with said graphical depiction on said graphical user interface, wherein said selection panel compiles an editable list of said promotional items that are sent to said selection panel in response to a selection request without accessing and querying said server for said editable list, wherein said editable list is produced by querying said auxiliary file for descriptive data corresponding to said editable list at the client computer without further accessing and querying said server for said descriptive data corresponding to said editable list.

31. A system of 30, wherein said order panel generator remains actively operable on the client computer when the client computer receives and displays a second graphical depiction of said promotional items from a second server, wherein said order panel generator displays said selection panel with said second graphical depiction on said graphical user interface, wherein descriptive data is read from a second auxiliary file to compile an editable list of said promotional items that are sent to said selection panel, wherein said auxiliary file corresponds to said promotional items.

32. A system of 30, wherein said order panel generator is stored and retrieved from a memory disposed on one of the client computer or said server when the client computer receives and displays a second graphical depiction of said promotional items from a second server, wherein said client computer is instructed to display said selection panel with said second graphical depiction, wherein descriptive data is read from said second auxiliary file to compile an editable list of said promotional items that are sent to said selection panel, wherein said auxiliary file corresponds to said promotional items.

33. A computer program product comprising a computer useable medium having computer readable program code embedded in said medium for causing an application program to execute on a computer that permits a user to order merchandise on the computer that communicates with two or more servers, said servers sending Web pages containing one or more promotional items of merchandise and said servers sending an auxiliary file for each Web page to provide descriptive data corresponding to the promotional items located thereon, said computer readable program code comprising:
a first computer readable program code for causing the computer to receive, from a server, a graphical depiction of a promotional item and an auxiliary file corresponding to said promotional item, wherein said graphical depiction and said auxiliary file are received in response to a request for said promotional item;
a second computer readable program code for causing the computer to display said graphical depiction on a graphical user interface coupled to said client computer;
a third computer readable program code for causing the computer to display descriptive data related to said promotional item by reading said auxiliary file without further accessing and querying the server for the descriptive data in response to a request to display the description data of the promotional depiction; and
a fourth computer readable program code for causing the computer to display a selection panel with said graphical depiction on said graphical user interface, wherein said selection panel compiles an editable list of said promotional items that are sent to said selection panel in response to a selection request without further accessing and querying the associated server, wherein said editable list is produced by querying said auxiliary file for descriptive data corresponding to said editable list at said computer without further accessing and querying the associated server for said descriptive data.

34. A computer program product according to claim 33, wherein said third computer readable program code remains actively operable on the computer when the computer receives and displays a second graphical depiction of said promotional items from a second server, wherein said third computer readable program code displays said selection panel with said second graphical depiction on said graphical user interface, wherein descriptive data is read from a second auxiliary file to compile an editable list of said promotional items that are sent to said selection panel, wherein said auxiliary file corresponds to said promotional items.

35. A computer program product according to claim 33, wherein said third computer readable program code is stored and retrieved from a memory disposed on one of the computer or said server when the computer receives and displays a second graphical depiction of said promotional items from a second server, wherein said computer is instructed to display said selection panel with said second graphical depiction, wherein descriptive data is read from said second auxiliary file to compile an editable list of said promotional items that are sent to said selection panel, wherein said auxiliary file corresponds to said promotional items.

* * * * *